United States Patent
Gao et al.

(10) Patent No.: US 11,523,435 B2
(45) Date of Patent: Dec. 6, 2022

(54) METHODS AND DEVICES FOR TRANSMITTING AND RECEIVING PHYSICAL RANDOM ACCESS CHANNEL

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/620,374

(22) PCT Filed: Jun. 9, 2017

(86) PCT No.: PCT/CN2017/087790
§ 371 (c)(1),
(2) Date: Dec. 6, 2019

(87) PCT Pub. No.: WO2018/223393
PCT Pub. Date: Dec. 13, 2018

(65) Prior Publication Data
US 2020/0154485 A1    May 14, 2020

(51) Int. Cl.
*H04W 74/08* (2009.01)
*H04B 7/06* (2006.01)
*H04L 27/26* (2006.01)

(52) U.S. Cl.
CPC ...... *H04W 74/0833* (2013.01); *H04B 7/0695* (2013.01); *H04L 27/2607* (2013.01)

(58) Field of Classification Search
CPC .............. H04W 74/0833; H04W 74/08; H04B 7/0695; H04L 27/2607
See application file for complete search history.

(56) References Cited

U.S. PATENT DOCUMENTS

| | | | |
|---|---|---|---|
| 2015/0181624 A1 | 6/2015 | Hwang et al. | |
| 2015/0365977 A1 | 12/2015 | Tabet et al. | |
| 2017/0006637 A1 | 1/2017 | Sahlin et al. | |
| 2018/0375698 A1* | 12/2018 | Zhang | H04W 74/006 |
| 2019/0158337 A1* | 5/2019 | Yoon | H04L 27/2666 |

(Continued)

FOREIGN PATENT DOCUMENTS

JP    2010-520689 A    6/2010

OTHER PUBLICATIONS

Communication dated Apr. 9, 2020, from the European Patent Office in European Application No. 17912988.7.

(Continued)

*Primary Examiner* — Peter P Chau
(74) *Attorney, Agent, or Firm* — Sughrue Mion, PLLC

(57) ABSTRACT

Embodiments of the present disclosure relate to a method, terminal device and apparatus for transmitting a physical random access channel (PRACH) and a method, network device and apparatus for receiving the PRACH. In an embodiment of the present disclosure, the method of transmitting PRACH comprises transmitting a physical random access channel, wherein the transmitted physical random access channel is different from a physical random access channel for initial access in at least one of parameter and structure. With embodiments of the present disclosure, the overhead of the PRACH transmission can be reduced in some cases, like a beam recovery request transmission and on-demand system information request transmission.

12 Claims, 14 Drawing Sheets

(56) References Cited

U.S. PATENT DOCUMENTS

| | | | |
|---|---|---|---|
| 2019/0281624 A1* | 9/2019 | Kim | H04L 27/26 |
| 2020/0053785 A1* | 2/2020 | Kim | H04L 27/26 |
| 2020/0099437 A1* | 3/2020 | Harada | H04W 76/19 |

OTHER PUBLICATIONS

Qualcomm Incorporated, "PRACH design consideration", 3GPP TSG-RAN WG1 #88, R1-1702592, Feb. 13-17, 2017, Athens, Greece, pp. 1-19 (19 pages total).

Qualcomm Incorporated, "Beam Recovery Procedures", 3GPP TSG-RAN WG1 #88, R1-1702606, Feb. 13-17, 2017, Athens, Greece, pp. 1-8 (8 pages total).

MediaTek et al., "WF on PRACH preamble format for NR new use cases", 3GPP TSG RAN WG1 Meeting #89, R1-1709777, May 15-17, 2017, Hangzhou, China, pp. 1-6 (6 pages total).

TCL, "PRACH design Resolving Time Ambiguity and Increasing Capacity", 3GPP TSG RAN WG1 Meeting #89, R1-1708218, 2017, 11 pages.

Samsung, "RACH preamble design", 3GPP TSG RAN WG1 NR #88, R1-1702908, 2017, 13 pages.

MediaTek Inc., "Discussion on PRACH design to support uplink requests", 3GPP TSG RAN WG1 Meeting #89, R1-1707840, 2017, 7 pages.

Communication dated Dec. 22, 2020 by the Japanese Patent Office in application No. 2019-567623.

Communication dated Feb. 23, 2021 by the European Patent Office in application No. 17 912 988.7.

MediaTek et al., "WF on PRACH preamble format for NR new use cases", 3GPP TSG RAN WG1 Meeting #89, R1-1709811, 2017, pp. 1-6 (6 pages total).

"Discussion on beam recovery procedure", Samsung, 3GPP TSG RAN WG1 Meeting #89, R1-1707954, Hangzhou, P.R. China, May 15-19, 2017, pp. 1-5.

"Discussion on beam recovery mechanism", ZTE, 3GPP TSG RAN WG1 Meeting #89, R1-1707121, Hangzhou, P.R. China, May 15-19, 2017, pp. 1-8.

International Search Report for PCT/CN2017/087790 dated Feb. 24, 2018 [PCT/ISA/210].

EP Office Action for EP Application No. EP179129887 dated Jul. 5, 2022.

ETRI: "Numerology evaluation results for high speed scenario". 3GPP Draft; R1-166939, Aug. 21, 2016.

Qualcomm Incorporated: "Scaled Numerology for URLLC UL Channel Design", 3GPP Draft; R1-1708630, May 14, 2017.

Huawei et al: "Discussion and evaluation on CP length for above 6GHz", 3GPP Draft; R1-1613309, Nov. 19, 2016.

Mediatek Inc: "Discussion on NR Numerology", 3GPP Draft, R1-167527, Aug. 12, 2016.

LG Electronics: "Initial Evaluation Result for NR Numerology", 3GPP Draft; R1-164559, May 14, 2016.

* cited by examiner

METHODS AND DEVICES FOR TRANSMITTING AND RECEIVING PHYSICAL RANDOM ACCESS CHANNEL

CROSS REFERENCE TO RELATED APPLICATIONS

This application is a National Stage of International Application No. PCT/CN2017/087790, filed on Jun. 9, 2017.

FIELD OF THE INVENTION

The non-limiting and exemplary embodiments of the present disclosure generally relate to the field of wireless communication techniques, and more particularly relate to a method, terminal device and apparatus for transmitting physical random access channel (PRACH), and a method, network device and apparatus for receiving PRACH.

BACKGROUND OF THE INVENTION

New radio access system, which is also called as NR system or NR network, is the next generation communication system. In Radio Access Network (RAN) #71 meeting for the third generation Partnership Project (3GPP) working group, study of the NR system was approved. The NR system will consider frequency ranging up to 100 Ghz with an object of a single technical framework addressing all usage scenarios, requirements and deployment scenarios defined in Technical Report TR 38.913, which includes requirements such as enhanced mobile broadband, massive machine-type communications, and ultra-reliable and low latency communications.

In the NR system, it was agreed to use multiple subcarrier values and corresponding frame structure for different scenarios. Based on the multiple subcarrier spacing values, initial access signals should be designed, including the following aspects:

Synchronization signal
Broadcast signal
Paging signal
Random access signal

In addition, during transmission between a network device and a terminal device, beam failure might occur when the quality of beam link(s) falls below a threshold for control/data information demodulation. This might be resulted from existing of barriers, frequency drift of terminal device crystal oscillation, etc. In such a case, it requires recovering the failure beam. In regard to a beam recovery, it was already agreed in RAN1 #89, to transmit a beam recovery request with non-contention based PRACH in NR system, which uses a resource orthogonal to resources of other PRACH transmissions at least for the Frequency Division Multiplexing (FDM) case. Other options, like Code Division Multiplexing (CDM)/Time Division Multiplexing (TDM), are still to be further studied.

For the PRACH design, it was agreed in the NR system that regarding multiple repeated PRACH preamble formats, the NR system at least supports option 1. The NR system supports PRACH preamble formats 0 and 1 for the sequence length of 839. Table 1 illustrates the parameters of the PRACH preamble formats 0 and 1.

TABLE 1

| Format | L | SCS (kHz) | BW (MHz) | N_OS | N_RP | T_SEQ (Ts) | T_CP (Ts) | T_GP | Use case |
|---|---|---|---|---|---|---|---|---|---|
| 0 | 839 | 1.25 | 1.08 | 1 | 1 | 24576 | 3168 | 2975 | LTE refarming |
| 1 | 839 | 1.25 | 1.08 | 2 | 1 | 2*24576 | 21024 | 21904 | Large Cell up to 100 km |

FIGS. 1A and 1B illustrate the structures of the PRACH preamble formats 0 and 1, from which it is clear that for format 0, it includes a CP, a PRACH symbol and a guard time; for format 1, it includes a CP, two PRACH symbols and a guard time.

In the working assumption, the NR supports PRACH preamble format indicated in Table 2 for the sequence of 839, restricted set and other sequence(s) for large cell radius are still for further study.

TABLE 2

| Format | L | SCS (kHz) | BW (MHz) | N_OS | N_RP | T_SEQ (Ts) | T_CP (Ts) | T_GP | Use case |
|---|---|---|---|---|---|---|---|---|---|
| 3 | 839 | 5 | 4.32 | 4 | 1 | 4*6144 | 3168 | 2976 | High speed case |

FIG. 1C illustrates the structures of the PRACH preamble format 3, from which it is clear that for format 3, it includes a CP, four PRACH symbols with a short length, and a guard time.

In NR system, there are one or several structures for PRACH design in NR. It was agreed that:

"For single/multi-beam operation,
For multiple/repeated RACH preamble transmissions, consider only option 1, option 2 and option 4:
Option 1: cyclic prefix (CP) is inserted at the beginning of the consecutive multiple/repeated RACH OFDM (Orthogonal Frequency Division Multiplexing) symbols, CP/Guard Time (GT) between RACH symbols is omitted and GT is reserved at the end of the consecutive multiple/repeated RACH symbols;

Option 2/4: The same/different RACH sequences with CP is used and GT is reserved at the end of the consecutive multiple/repeated RACH sequences;

Study:
Multiplexing with different orthogonal cover codes
Independent RACH sequences in a RACH preamble FIG. 2A illustrates the structures of the RACH preamble in Option 1, wherein one CP is inserted before the consecutive/repeated RACH symbols and only one GT is reserved at the end of the consecutive/repeated RACH. FIG. 2B illustrates structures of the PRACH preamble in Option 2/4, wherein a CP is arranged before each RACH symbol and a guard time is reserved at the end of the consecutive multiple/repeated RACH sequences.

However, due to differences between the initial access and the beam recovery request, it is required to provide a solution for PRACH transmission and receiving in the art.

SUMMARY OF THE INVENTION

To this end, in the present disclosure, there is provided a new solution for PRACH transmission and receiving, to mitigate or at least alleviate at least part of the issues in the prior art.

According to a first aspect of the present disclosure, there is provided a method of transmitting physical random access channel. The method may comprises transmitting a physical random access channel, wherein the transmitted physical random access channel is different from a physical random access channel for initial access in at least one of parameter and structure.

According to a second aspect of the present disclosure, there is provided a method of receiving physical random access channel. The method may comprise receiving a physical random access channel, wherein the received physical random access channel is different from a physical random access channel for initial access in at least one of parameter and structure.

According to a third aspect of the present disclosure, there is provided a terminal device. The terminal device may comprise a transceiver configured to transmit a physical random access channel, wherein the transmitted physical random access channel is different from a physical random access channel for initial access in at least one of parameter and structure.

According to a fourth aspect of the present disclosure, there is provided a network device. The network device may comprise a transceiver configured to receive a physical random access channel, wherein the received physical random access channel is different from a physical random access channel for initial access in at least one of parameter and structure.

According to a fifth aspect of the present disclosure, there is provided a terminal device. The terminal device may comprise a processor and a memory. The memory may be coupled with the processor and have program codes therein, which, when executed on the processor, cause the terminal device to perform operations of the first aspect.

According to a sixth aspect of the present disclosure, there is provided a network device. The network device may comprise a processor and a memory. The memory may be coupled with the processor and having program codes therein, which, when executed on the processor, cause the network device to perform operations of the second aspect.

According to a seventh aspect of the present disclosure, there is provided a computer-readable storage media with computer program code embodied thereon, the computer program code configured to, when executed, cause an apparatus to perform actions in the method according to any embodiment in the first aspect.

According to an eighth aspect of the present disclosure, there is provided a computer-readable storage media with computer program code embodied thereon, the computer program code configured to, when executed, cause an apparatus to perform actions in the method according to any embodiment in the second aspect.

According to a ninth aspect of the present disclosure, there is provided a computer program product comprising a computer-readable storage media according to the seventh aspect.

According to a tenth aspect of the present disclosure, there is provided a computer program product comprising a computer-readable storage media according to the eighth aspect.

With embodiments of the present disclosure, the overhead of the PRACH transmission can be reduced in some cases, like a beam recovery request transmission and on-demand system information request transmission.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Figure 1A:
FIGS. 1A to 1C illustrate the structures of the PRACH preamble format 0, 1 and 3 in NR system.
Figure 1B:
Figure 1C:
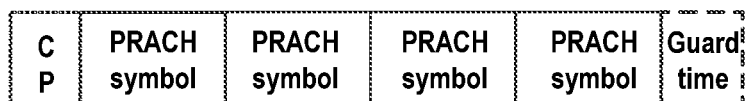
Figure 2A:
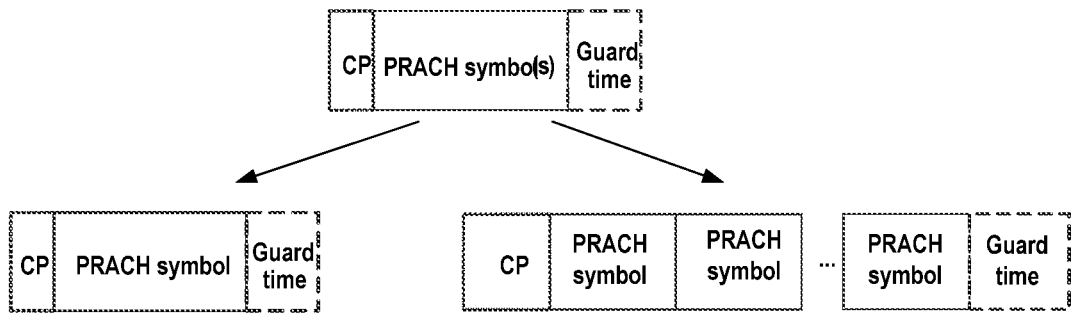
FIGS. 2A and 2B illustrates structures of the RACH preamble in Option 1 and Option 2/4.
Figure 2B:

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (next generation Node B), a radio header (RH), a remote radio head (RRH), a relay, or a low power node such as a femto, a pico, and so on.

As already mentioned, in the NR system, the beam recovery request is to recover the failed beam and it is different from the initial access in many aspects. For illustration purposes, FIGS. 3A and 3B illustrate a random access procedure and a diagram for time advance adjustment in the LTE system.

Figure 3A:
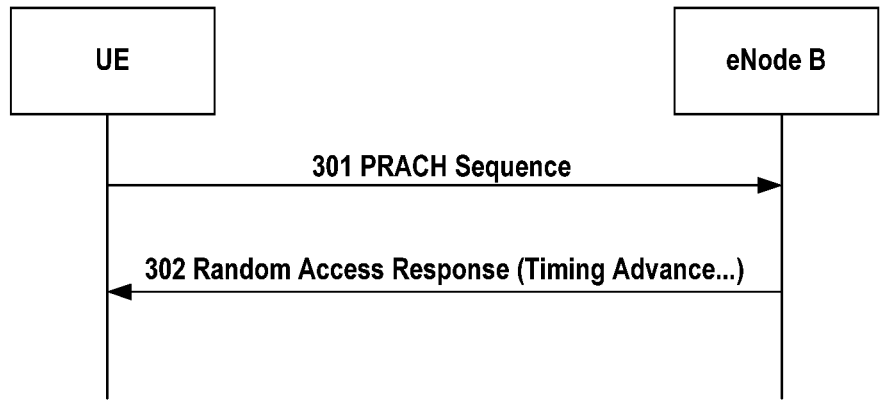
FIG. 3A illustrates a random access procedure in LTE system.
Figure 3B:
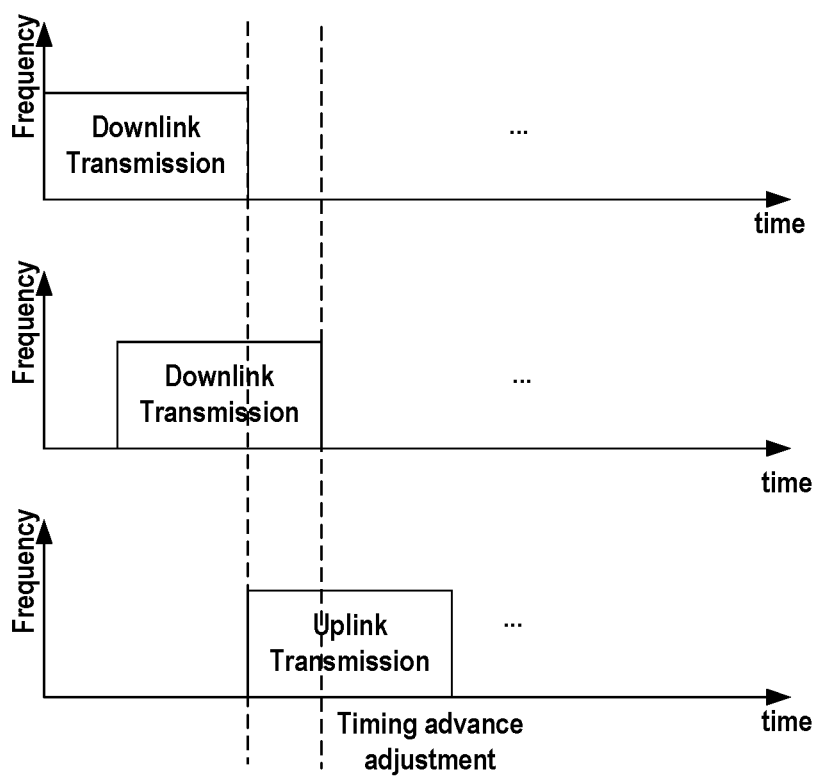
FIG. 3B illustrates a diagram for time advance adjustment in LTE system.

As illustrated in FIG. 3A, in step 101, UE transmits a PRACH sequence to the eNB and the eNB receives the PRACH sequence and obtains the timing advance value $N_{TA}$ based on the PRACH sequence. Then, in step 302, the eNB contains the timing advance value $N_{TA}$ in a random access response and transmits it to the UE. Next, the UE may transmit the uplink channel/signals with the timing advance value $N_{TA}$. For the initial access, the uplink transmission from the UE is transmitted $(N_{TA}+N_{TA\_offset})*Ts$ seconds before the start of the corresponding downlink radio frame at UE, wherein for the FDD frame structure, $N_{TA\_offset}=0$, while for the TDD frame structure, $N_{TA\_offset}=M$ (M is a fixed value). For timing advance adjustment in uplink synchronization, the UE transmits uplink channels/signals with the new timing advance value $N_{TA,new}$ obtained by adding received $N_{TA}$ to $N_{TA,old}$ and perform the uplink transmission $N_{TA,new}*Ts$ second before the start of the corresponding downlink radio frame at UE.

In the LTE, the PRACH is designed for the timing advance calculation. In the NR system, for the initial access and the uplink synchronization; it is possible to use the PRACH procedure in the LTE system directly. However, for the beam recovery request, the UE may still in a synchronization state, which means that the timing advance value is still useful for the beam recovery request transmission and thus the existing PRACH procedure is suitable for the beam recovery request transmission. Thus, in the present disclosure, there is proposed a solution for transmitting PRACH for cases without timing advance adjustment, like beam recovery request, no-demand SI request and etc.

Hereinafter, reference will be further made to FIGS. 4 to 14 to describe PRACH transmission solution as proposed in the present disclosure in details. It shall be appreciated that all embodiments are given for illustrative purposes and the present disclosure is not limited thereto. In the embodiments described hereinbelow, it will take the beam recovery request as an example to describe the solution as proposed in the present disclosure.

Figure 4:
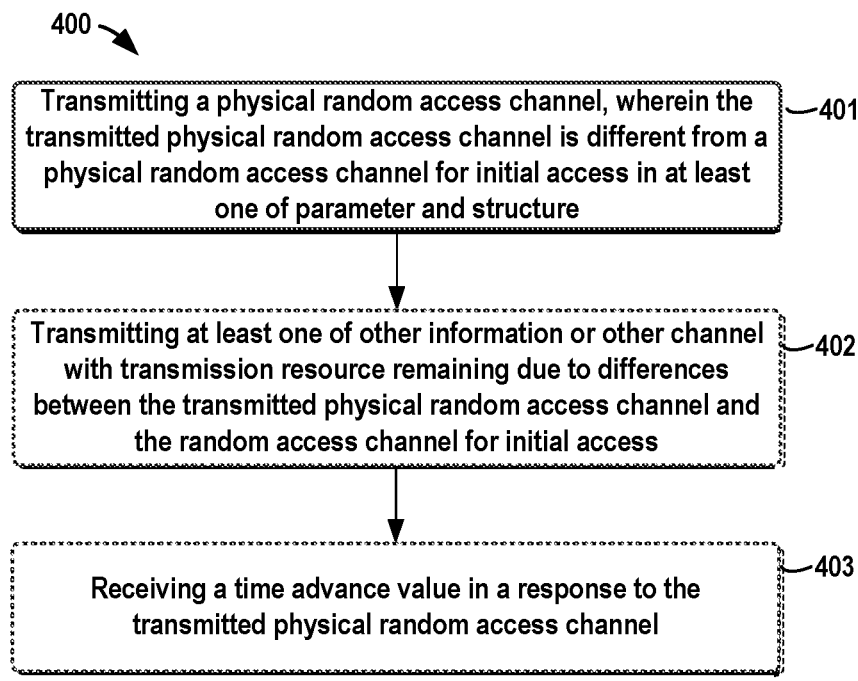
FIG. 4 schematically illustrates a flow chart of a method of transmitting PRACH at a terminal device according to an embodiment of the present disclosure.

FIG. 4 schematically illustrates a flow chart of a method 400 of transmitting PRACH at a terminal device according to an embodiment of the present disclosure. The method 400 can be performed at a terminal device, for example UE, or other like terminal devices.

As illustrated in FIG. 4, first in step 401, the terminal device may transmit a physical random access channel, wherein the transmitted physical random access channel is different from a physical random access channel for initial access and/or uplink synchronization and/or timing advance adjustment in at least one of parameter and structure. This means that the PRACH for beam recovery request may have a different structure from that for the initial access for example in parameters, in structure or in both.

In some embodiments of the present disclosure, the exiting TA can still be used in this procedure. In other words, the transmitting a physical random access channel can start at a timing before a start of a corresponding downlink reception, which is determined based on a timing advance value indicated by a network device. For example, as mentioned before, for the beam recovery request, the UE may still in a synchronization state and, the timing advance value is still useful for the beam recovery request transmission. Thus, in such a case, there is usually no requirement for timing advance adjustment and thus the TA indicated by the network device previously can still be used.

In an embodiment of the present disclosure, the terminal device may transmit a physical random access channel, wherein the transmitted physical random access channel is different from a physical random access channel for initial access and/or PRACH transmission for timing advance adjustment and/or uplink synchronization in at least one of parameter and structure. The parameters and/or structure may comprise, for example, one or more of cyclic shift configurations; cyclic prefix length; index of sequences; guard time/period length; the number of symbols or sequences; the length of symbols or sequences; time and/or frequency resource, PRACH format, subcarrier spacing, length of sequence, and etc.

In some embodiments of the present disclosure, the beam recovery request may use the PRACH with a different structure from that for initial access and/or the uplink synchronization. In an embodiment of the present disclosure, for beam failure recovery request, or for on demand SI (system information) request, the PRACH can contain no guard time and/or guard period. In another embodiment of the present disclosure, the PRACH may have at least one of a different guard time length, a different guard period length, a different CP length, a different symbol(s)/sequence(s)/preamble(s) length, a different number of symbol(s)/sequence(s)/preamble(s) of PRACH. For example, the PRACH may have a shorter guard time length, a shorter guard period length, a shorter CP length, a longer CP length, a shorter symbol(s)/sequence(s)/preamble(s) length, a less number of symbol(s)/sequence(s)/preamble(s) of PRACH, or any combination thereof.

In some embodiments of the present disclosure, the beam recovery request may use the PRACH with a different parameter from that for initial access and/or the uplink synchronization, and/or timing advance adjustment. In an embodiment of the present disclosure, at least one of the number of CS values, the CS values configured for beam failure recovery request, the sequences configured for beam failure recovery request may be different. For example, the number of CS values may be larger for beam failure recovery request. For another example, the CS values configured for beam failure recovery request may be different. In an embodiment of the present disclosure, the time interval based on the CS values may be smaller than those for beam failure recovery request.

Hereinafter, details about the PRACH for the cases like the beam recovery request, the on-demand SI request, and etc., will be described. However, it shall be noticed that in the following description, the PRACH for beam recovery request will be taken as an example, but the present disclosure is not limited thereto. The present disclosure may also be used for the PRACH for on-demand SI request, or other purpose as well. In addition, for illustration purposes, the PRACH for initial access, and/or uplink synchronization, and/or timing advance adjustment can be called as the PRACH for initial access, for short, but the skilled in the art can appreciate that the PRACH can be used for any of initial access, uplink synchronization, and timing advance adjustment.

In an embodiment of the present disclosure, in the NR system, there are a plurality of PRACH configurations. The configurations can comprise at least one of PRACH format, root of sequence, sequence index, number of cyclic shift values, value of cyclic shift, sequence length, value of subcarrier spacing, number of repetitions, length of CP, length of guard time and/or guard period, number of symbol(s)/sequence(s), length of symbol(s)/sequence(s), time and/or frequency resources and etc. For example, in the NR system, there are different PRACH formats like formats 0, 1, 2, and 3. The PRACH can also have different length, like 839, 127 or 139. Moreover, the PRACH can adopt different subcarrier spacing, like 1.25 kHz, 5 kHz, 7.5 kHz, 15 kHz, 30 kHz, 60 kHz, 120 kHz, and etc.

In an embodiment of the present disclosure, some of the PRACH configurations can be configured for the initial access or the uplink synchronization and some of the PRACH configurations can be configured for other cases like beam recovery request, on-demand SI request, and so on.

In an embodiment of the present disclosure, for a given configured PRACH for the other cases, at least one parameter can be different from that for the initial access and/or the uplink synchronization. The parameter can comprise at least one of structures, cyclic shift configurations (cyclic shift values or number of cyclic shift values), index of sequences, guard time/guard period length, cyclic prefix length, number of symbol(s)/sequence(s)/preamble(s), length of symbol(s)/sequence(s)/preamble(s), time and/or frequency resources and etc. Hereinafter, the described PRACH symbol(s) may be denoted as any of PRACH symbol(s), PRACH sequence(s), PRACH preamble(s).

Figure 5A:
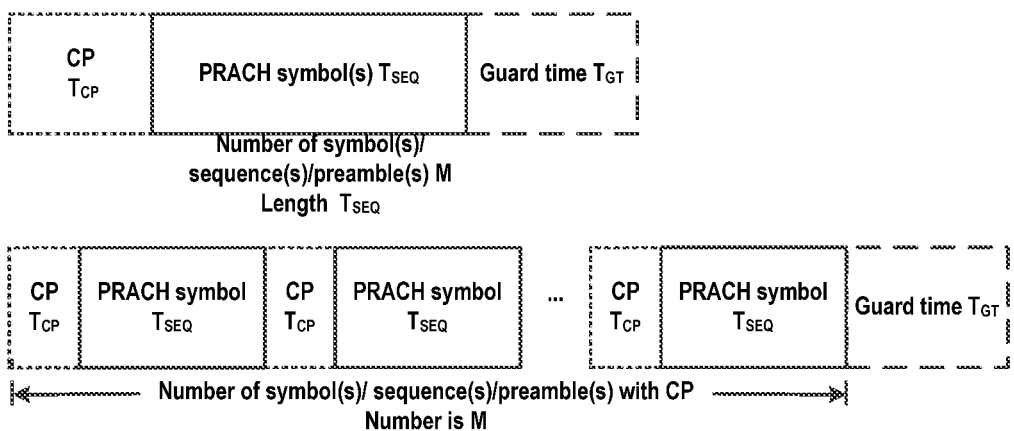
FIG. 5A illustrates two types of options of the PRACH structures.

In an embodiment, for a PRACH configuration, if it is configured for initial access, and/or uplink synchronization, and/or timing advance adjustment, the length for PRACH symbol(s) and/or PRACH sequence(s) and/or PRACH preamble(s) can be denoted as $T_{SEQ}$, the number of PRACH symbol(s) and/or PRACH sequence(s) and/or PRACH preamble(s) can be denoted as M, the CP (cyclic prefix) may have a length denoted as $T_{CP}$ and be located at the beginning of the PRACH sequence(s) (Option 1), or before each PRACH sequence (Option 2), and the guard time and/or guard period with length $T_{GT}$, located at the end of the PRACH sequence(s), as illustrated in example structure of PRACH for the initial access and/or uplink synchronization FIG. 5A. It shall be appreciated that, for different PRACH configurations, at least one of the predefined CP length $T_{CP}$, length for PRACH symbol(s) and/or PRACH sequence(s) $T_{SEQ}$, number of PRACH symbol(s) and/or PRACH sequence(s) $T_{SEQ}$, predefined guard time/guard period $T_{GT}$ may be different. For example, the different PRACH configurations may be different PRACH formats.

In an embodiment of the present disclosure, if a PRACH configuration is configured for the other cases, the length for PRACH symbol(s) and/or PRACH sequence(s) can be denoted as $T_{SEQ\_B}$, the CP (cyclic prefix) may have a length $T_{CP\_B}$ and be located for example at the beginning of the PRACH sequence(s) (Option 1) and before each PRACH sequence (Option 2/4), and/or the guard time/guard period with length $T_{GT\_B}$, e.g. located at the end of the PRACH sequence(s). In an embodiment of the present disclosure, for a PRACH configuration for the other cases, at least one of the above lengths can be different with those for initial access and/or uplink synchronization.

In an embodiment of the present disclosure, for a PRACH configuration for the other cases, there may be no guard time and/or guard period. In an embodiment of the present disclosure, one PRACH format may be configured for initial access and/or uplink synchronization and/or timing advance adjustment. And for the PRACH configuration for the other cases, the same PRACH format may be configured, and at least one of the length of CP, the length of PRACH symbol(s)/sequence(s)/preamble(s), the number of PRACH symbol(s)/sequence(s)/preamble(s), the length of guard time and/or guard period may be different.

In an embodiment of the present disclosure, for a PRACH configuration, if it is configured for the other cases such as beam failure recovery request, or on demand SI request, and etc., the CP length $T_{CP\_B}$ may be different with $T_{CP}$, e.g. shorter than $T_{CP}$.

In an embodiment of the present disclosure, for a PRACH configuration, if it is configured for the other cases such as beam failure recovery request, or on demand SI request, and etc., the guard time/guard period length $T_{GT\_B}$ may be different with $T_{GT}$, e.g. shorter than $T_{GT}$; or alternatively, there may be no guard time and/or guard period.

In an embodiment of the present disclosure, for a PRACH configuration, if it is configured for other cases such as beam failure recovery request, or on demand SI request, and etc., the PRACH symbol(s) and/or sequence(s) length $T_{SEQ\_B}$ may be different with $T_{SEQ}$, e.g. shorter than $T_{SEQ}$. In an embodiment of the present disclosure, for a PRACH transmission for initial access and/or uplink synchronization, there may be M (M>=1 integer) sequences, e.g. in PRACH symbol(s)/sequence(s)/preamble(s), and the length may be $T_{SEQ}$. For PRACH transmission for other cases such as beam failure recovery request, or on demand SI request, and etc., there may be N (N>=1 integer) sequences, e.g. in PRACH symbol(s)/sequence(s)/preamble(s), and the length may be $T_{SEQ\_B}$. The M may be different with the N and the sequences may be same or different. For example, the value of N may be different with that of M, e.g. N<=M. It is even possible that N=1 for PRACH transmission for other cases. For another example, the sequence repeats M times for PRACH transmission for initial access and/or uplink synchronization, while the sequence repeats N times for PRACH transmission for the other cases. The value of N may be different with that of M, e.g. N<=M. It is even possible that there is no sequence repetition for PRACH transmission for other cases, i.e. N=1.

Figure 5B:
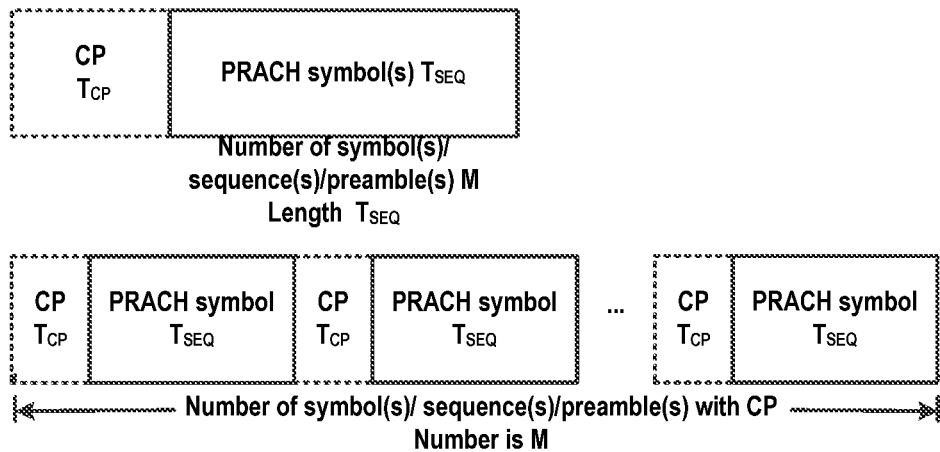
FIGS. 5B and 5C illustrate example structures of the PRACH for the other cases like beam recovery request, on-demand SI request and etc., according to an embodiment of the present disclosure.
Figure 5C:
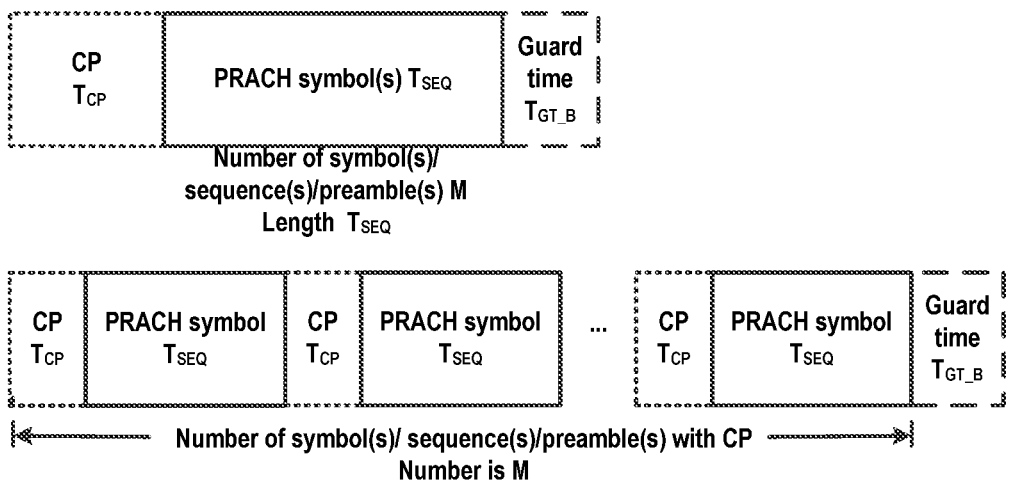

In one embodiment, for a PRACH configuration, if it is configured for initial access and/or uplink synchronization, there is (e.g. predefined) guard time and/or guard period $T_{GT}$ e.g. located at the end of the PRACH symbol(s)/sequence(s). Whereas, for a PRACH configuration, if it is configured for the other cases, there is no guard time (as illustrated in FIG. 5B) and/or guard period in the PRACH structure; or the guard time and/or guard period $T_{GT\_B}$ may be different with $T_{GT}$, e.g. shorter than $T_{GT}$ (as illustrated in FIG. 5C).

In an embodiment of the present disclosure, for a PRACH configuration, if it is configured for initial access and/or timing advance adjustment, the length for PRACH symbol(s) and/or PRACH sequence(s) and/or PRACH preamble(s) may be denoted as $T_{SEQ}$, the length of CP (cyclic prefix) may be denoted as $T_{CP}$, and the length of guard time and/or guard period may be denoted as $T_{GT}$, the number of PRACH symbol(s)/sequence(s)/preamble(s) may be denoted as M. In an embodiment of the present disclosure, the total length of CP and PRACH symbol(s)/sequence(s)/preamble(s) and guard time/period $T_{CP}+T_{SEQ}+T_{GT}$ may equal to P. In another embodiment of the present disclosure, the total length may equal to a P number of time units Ts (P*Ts), wherein Ts denotes a predetermined time unit and P is a positive integer number; or the total length may equal to a time duration P (ms), and in such a case P can be defined as the total time duration (ms) of the total length. In a further embodiment of the present disclosure, the total length may equal to total length of integer number of time durations, $T_{CP}+T_{SEQ}+T_{GT}=\Sigma_{i=1:K}(N_{CP,i}+N_{S,i})$, where each time duration may be duration of OFDM/SC-FDMA symbol with cyclic prefix, where $N_{S,i}$ may denote the length of i-th OFDM/SC-FDMA symbol, $N_{CP,i}$ may denote the length of CP for i-th OFDM/SC-FDMA symbol. In an embodiment of the present disclosure, the number may be denoted as K, and for each i=1, 2 . . . K, the length of time duration may be denoted as $N_{CP,i}$-$N_{S,i}$. In an embodiment of the present disclosure, the length of CP and/or length of symbol may be different for different time duration i. For example, the CP for the first symbol in the slot/subframe may be longer than that for other symbols. In an embodiment of the present disclosure, the length of OFDM/SC-FDMA symbol and/or CP may be different for different values of subcarrier spacing. In another embodiment of the present disclosure, for different subcarrier spacing for the transmission, the number K may be different. For example, the number may be $K_1$ for subcarrier spacing $\Delta f_1$ and the number may be $K_i$ for subcarrier spacing $\Delta f_i$.

In an embodiment of the present disclosure, for a PRACH configuration, if it is configured for other cases such as beam failure recovery request, or on demand SI request, and etc., the length for PRACH symbol(s) and/or PRACH sequence (s) and/or PRACH preamble(s) may be denoted as $T_{SEQ\_B}$, the length of CP (cyclic prefix) may be denoted as $T_{CP\_B}$, and the length of guard time and/or guard period may be denoted as $T_{GT\_B}$, the number of PRACH symbol(s)/sequence(s)/preamble(s) may be denoted as N. In an embodiment of the present disclosure, at least one of the length of CP, the length of PRACH symbol(s)/sequence(s)/preamble(s), the length of guard time and/or guard period, the number of PRACH symbol(s)/sequence(s)/preamble(s) may be different with those for initial access and/or timing advance adjustment and/or uplink synchronization. In another embodiment of the present disclosure, there may be no guard time and/or guard period for the other cases such as beam failure recovery request, or on demand SI request, and etc.; in other word, the length of guard time and/or guard period may be zero. In another embodiment of the present disclosure, the number of PRACH sequence(s)/symbol(s)/sequence(s) may be 1.

In an embodiment of the present disclosure, the total length of CP and PRACH symbol(s)/sequence(s)/preamble(s) and guard time/period $T_{CP\_B}+T_{SEQ\_B}+T_{GT\_B}$ may equal to Q. In another embodiment of the present disclosure, the total length of CP and PRACH symbol(s)/sequence(s)/preamble(s) $T_{CP\_B}+T_{SEQ\_B}$ may equal to Q. For example, there may be no guard time and/or guard period. In an embodiment of the present disclosure, the total length may equal to a number of time units Q*Ts or a time duration Q (ms). In an embodiment of the present disclosure, the total length of CP and PRACH symbol(s)/sequence(s)/preamble(s) and guard time/period or total length of CP and PRACH symbol(s)/sequence(s)/preamble(s) Q, for PRACH for the other cases such as beam failure recovery request, or on demand SI request, and etc., may be different from the total length of CP and PRACH symbol(s)/sequence(s)/preamble(s) and guard time/period or total length of CP P for PRACH for initial access, for example, Q≤P.

In an embodiment of the present disclosure, the length of Q may be less than or no larger than the length of P. In other word, there may be a remaining time and/or frequency resources for other cases such as beam failure recovery request, or on demand SI request, and etc. In an embodiment of the present disclosure, the remaining resources may be used for other signal/channel transmission. In an embodiment of the present disclosure, the time duration and/or length for the remaining resources may equal to P−Q. In another embodiment of the present disclosure, the time duration and/or length for the remaining resources may be less than P−Q, for example the length of P−Q may not equal to integer number of time durations, where each time duration ($N_{CP,j}+N_{S,j}$) may be duration of OFDM/SC-FDMA symbol with cyclic prefix, where $N_{S,j}$ may be the length of j-th OFDM/SC-FDMA symbol, $N_{CP,j}$ may denote the length of CP for j-th OFDM/SC-FDMA symbol. In an embodiment of the present disclosure, the remaining resource with the time duration and/or length P−Q, may be used for other signal/channel transmission. For example, the number of OFDM/SC-FDMA symbols for other transmission may be $N_t$, where $N_t$ may be the (maximum) integer number of OFDM-SC-FDMA symbols contained in the time duration and/or length P−Q. For example, $N_t$ may equal to floor $((P-Q)/(N_{CP,j}+N_{S,j}))$. In an embodiment of the present disclosure, the number of OFDM/SC-FDMA symbols may be different for different values of subcarrier spacing for other signal/channel transmission. For example, the time duration and/or length of OFDM/SC-FDMA symbol and/or length of CP may be different for different values of subcarrier spacing. For example, the number may be $N_{t\_1}$ for subcarrier spacing value $\Delta f_1$ and the number may be $N_{t\_i}$ for subcarrier spacing value $\Delta f_i$.

In an embodiment of the present disclosure, the remaining time and/or frequency resources may be used for other signal/channel transmission. In an embodiment of the present disclosure, the remaining time and/or frequency resources may be located before the resources for PRACH transmission in time domain. In an embodiment of the present disclosure, the remaining time and/or frequency resources may be located after the resources for PRACH transmission in time domain. In an embodiment of the present disclosure, some part of the remaining time and/or frequency resources may be located before the resources for PRACH transmission in time domain and other part thereof may be located before the resources for PRACH transmission in time domain.

In an embodiment of the present disclosure, for a PRACH configuration, if it is configured for other cases such as beam failure recovery request, or on demand SI request, and etc., at least one of the length of CP, the length of PRACH symbol(s)/sequence(s)/preamble(s), the length of guard time and/or guard period, the number of PRACH symbol(s)/sequence(s)/preamble(s) may be different for different values of subcarrier spacing configured for uplink and/or downlink transmission. In an embodiment of the present disclosure, the uplink and/or downlink transmission may be uplink data, uplink control channel, uplink reference signal, PRACH, downlink data, downlink control channel, downlink reference signal, uplink and/or downlink reference subcarrier spacing. In an embodiment of the present disclosure, the value of subcarrier spacing for uplink and/or downlink transmission may be configured as $\Delta f_i$, the length for PRACH symbol(s) and/or PRACH sequence(s) and/or PRACH preamble(s) may be $T_{SEQ\_B\_i}$, the length of CP (cyclic prefix) may be $T_{CP\_B\_i}$, and the length of guard time and/or guard period may be $T_{GT\_B\_i}$, the number of PRACH symbol(s)/sequence(s)/preamble(s) may be $N_i$. An example is illustrated in Table 1.

TABLE 1 different parameter or configurations for different subcarrier spacings

| Length of CP | Length of symbol(s)/ sequence(s)/ preamble(s) | Length of guard time and/or guard period | Number of symbol(s)/ sequence(s)/ preamble(s) | Subcarrier spacing value for other signal/channel transmission |
|---|---|---|---|---|
| $T_{CP\_B\_1}$ | $T_{SEQ\_B\_1}$ | $T_{GT\_1}$ | $N_1$ | $\Delta f_1$ |
| ... | ... | ... | ... | ... |
| $T_{CP\_B\_i}$ | $T_{SEQ\_B\_i}$ | $T_{GT\_i}$ | $N_i$ | $\Delta f_i$ |

In an embodiment of the present disclosure, the total length of CP and PRACH symbol(s)/sequence(s)/preamble(s) and guard time/period, or the total length of CP and PRACH symbol(s)/sequence(s)/preamble(s) may be different for different values of subcarrier spacing configured for uplink and/or downlink transmission. In an embodiment of the present disclosure, the value of subcarrier spacing for uplink and/or downlink transmission may be configured as $\Delta f_i$, the total length of CP and PRACH symbol(s)/sequence(s)/preamble(s) and guard time/period, or the total length of CP and PRACH symbol(s)/sequence(s)/preamble(s) may be $Q_i$.

In an embodiment of the present disclosure, a set of values of subcarrier spacing may be configured for transmission of other signal/channel transmission. The set of values of subcarrier spacing may be divided into H subsets. For one subset of values of subcarrier spacing configured for other signal/channel transmission, at least one of the length of PRACH symbol(s) and/or PRACH sequence(s) and/or PRACH preamble(s), the length of CP (cyclic prefix), the length of guard time and/or guard period, the number of PRACH sequence(s)/symbol(s)/preamble(s) may be the same. In another embodiment of the present disclosure, for different subsets of values, the length may be different. In an embodiment of the present disclosure, at least one of the length of CP, the length of guard time/period may be configured based on the maximum or the minimum value of subcarrier spacing in the subset.

In an embodiment of the present disclosure, a PRACH format may be configured for the other cases, such as beam failure recovery request, or on demand SI request, and etc. For different values of subcarrier spacing configured for uplink and/or downlink transmission, at least one of the length of CP, the length of PRACH symbol(s)/sequence(s)/preamble(s), the number of PRACH symbol(s)/sequence(s)/preamble(s), the length of guard time and/or guard period, the total length of CP and PRACH symbol(s) and guard time/period, total length of CP and PRACH symbol(s) may be different.

In an embodiment of the present disclosure, the total length of CP and PRACH symbol(s) may not equal to integer number of time durations, where each time duration may be the duration of OFDM/SC-FDMA symbol with cyclic prefix. In another embodiment of the present disclosure, the boundary of PRACH symbol(s) with CP may be not aligned with boundary of symbol/slot/mini-slot/subframe.

In an embodiment of the present disclosure, for the PRACH for the other cases such as beam failure recovery request, or on demand SI request, and etc., additional time duration with length $T_{res}$ may be reserved to subject the total length of $T_{CP\_B}+T_{SEQ\_B}+T_{res}$ being equal to integer number of time durations, $T_{CP\_B}+T_{SEQ\_B}+T_{res}=\Sigma_{j=1:L}(N_{CP,j}+N_{S,j})$ where each time duration may be duration of OFDM/SC-FDMA symbol with cyclic prefix, where $N_{S,j}$ may denote the length of j-th OFDM/SC-FDMA symbol, $N_{CP,j}$ may denote the length of CP for j-th OFDM/SC-FDMA symbol. In an embodiment of the present disclosure, the number may be denoted as L, and for each j=1, 2 ... L, the length of time duration may be $N_{CP,j}|N_{S,j}$. In an embodiment of the present disclosure, the length of CP and/or length of OFDM/SC-FDMA symbol may be different for different time duration j. For example, the CP for the first symbol in the slot/subframe may be longer than that for other symbols. In an embodiment of the present disclosure, the length of OFDM/SC-FDMA symbol and/or CP may be different for different values of subcarrier spacing. In another embodiment of the present disclosure, for different subcarrier spacing for the transmission, the number L may be different. For example, the number may be $L_1$ for subcarrier spacing $\Delta f_1$ and the number may be $L_i$ for subcarrier spacing $\Delta f_i$. In an embodiment of the present disclosure, the reserved length may be different for different values of subcarrier spacing for transmission of PRACH and/or uplink signal/channel. For example, the length may be $T_{res\_1}$ for subcarrier spacing value $\Delta f_1$ and the length may be $T_{res\_i}$ for subcarrier spacing value $\Delta f_i$.

Figure 6A:
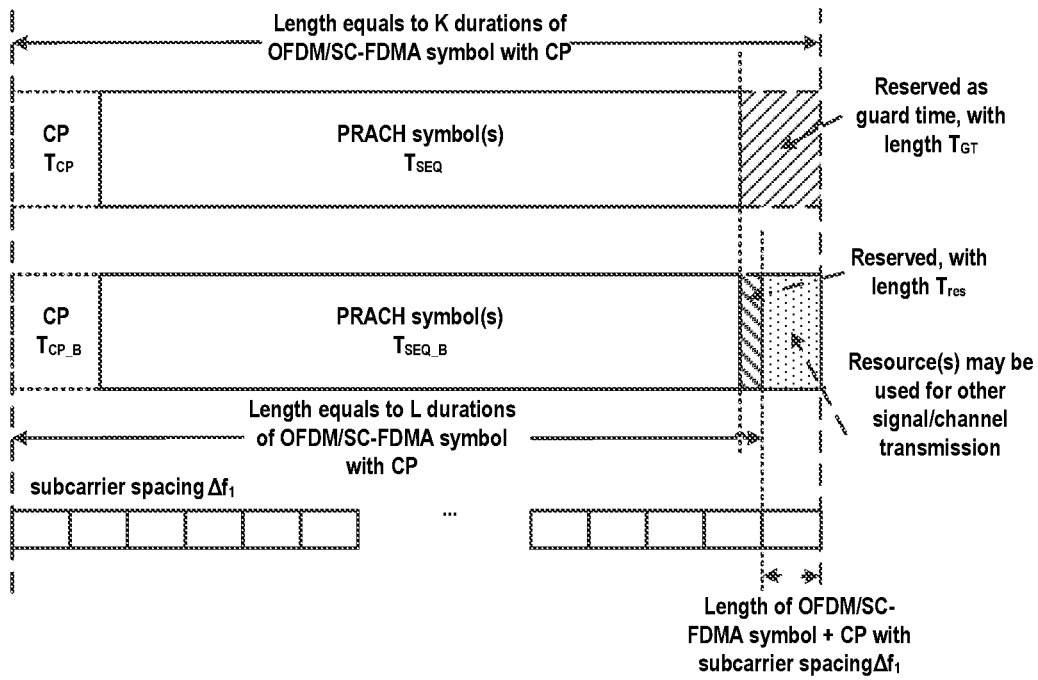
FIGS. 6A to 6G illustrates example structures of the PRACH structure for the other cases according to some embodiments of the present disclosure.

FIG. 6A illustrates an example of a PRACH configuration configured for the other cases, such as beam failure recovery request, or on demand SI request, and etc. As illustrated, the reserved length $T_{res}$ may be reserved as guard time/period, for example, the length of guard time/period $T_{GT\_B}$ may equal to $T_{res}$. In another embodiment of the present disclosure, the reserved length $T_{res}$ may be added in guard time/period length as a part of the guard time/period, for example, the length of guard time/period may equal to $T_{GT\_B}+T_{res}$.

Figure 6B:
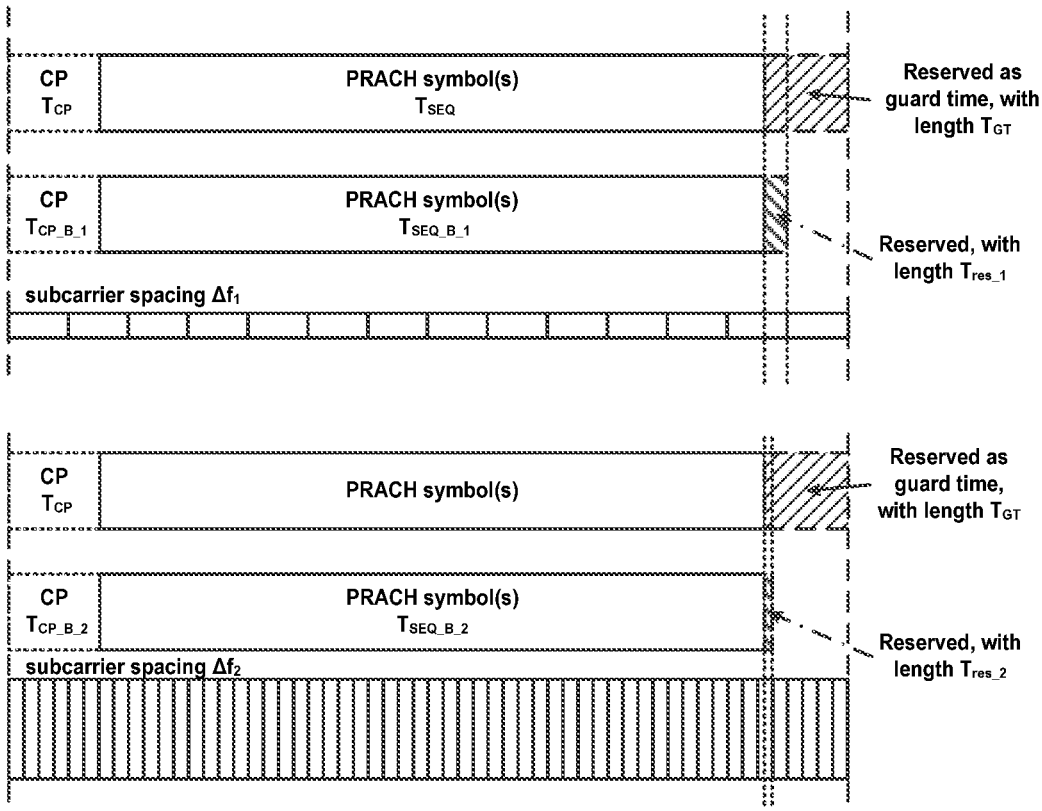

FIG. 6B illustrates another example of a PRACH configuration configured for the other cases, such as beam failure recovery request, or on demand SI request, and etc. According to some embodiments, the reserved length $T_{res}$ may be different for different values of subcarrier spacing configured for uplink and/or downlink transmission.

Figure 6C:
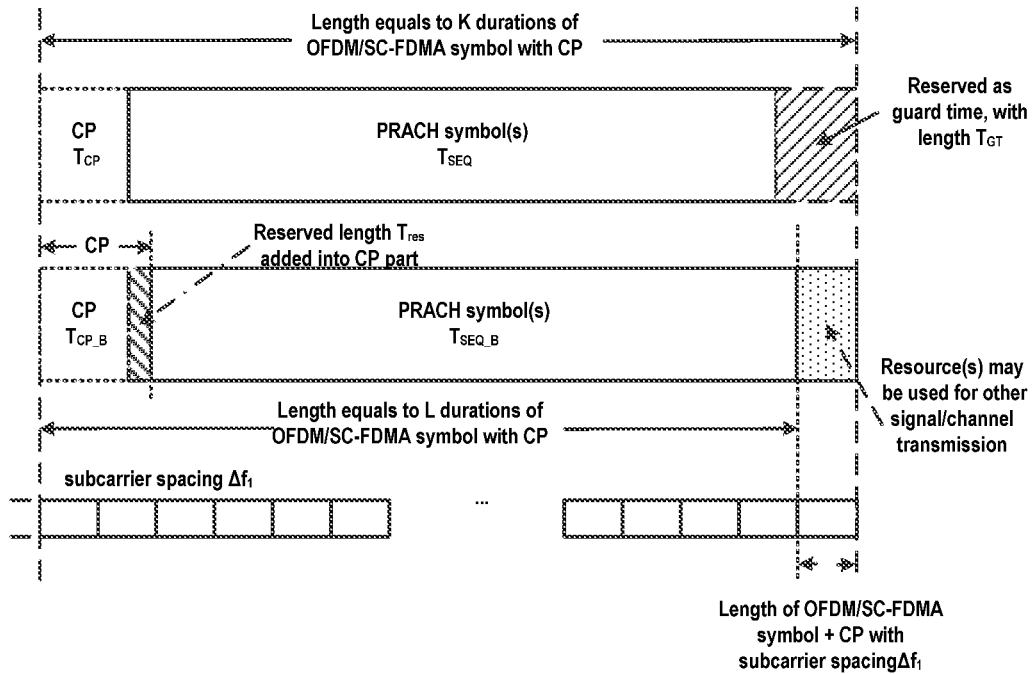

FIG. 6C illustrates a further example of a PRACH configuration configured for the other cases, such as beam failure recovery request, or on demand SI request, and etc. As illustrated, the reserved length $T_{res}$ may be added in CP length as a part of the CP length, for example, the length of CP may equal to $T_{CP\_B}+T_{res}$. An example is illustrated in FIG. 6C.

Figure 6D:
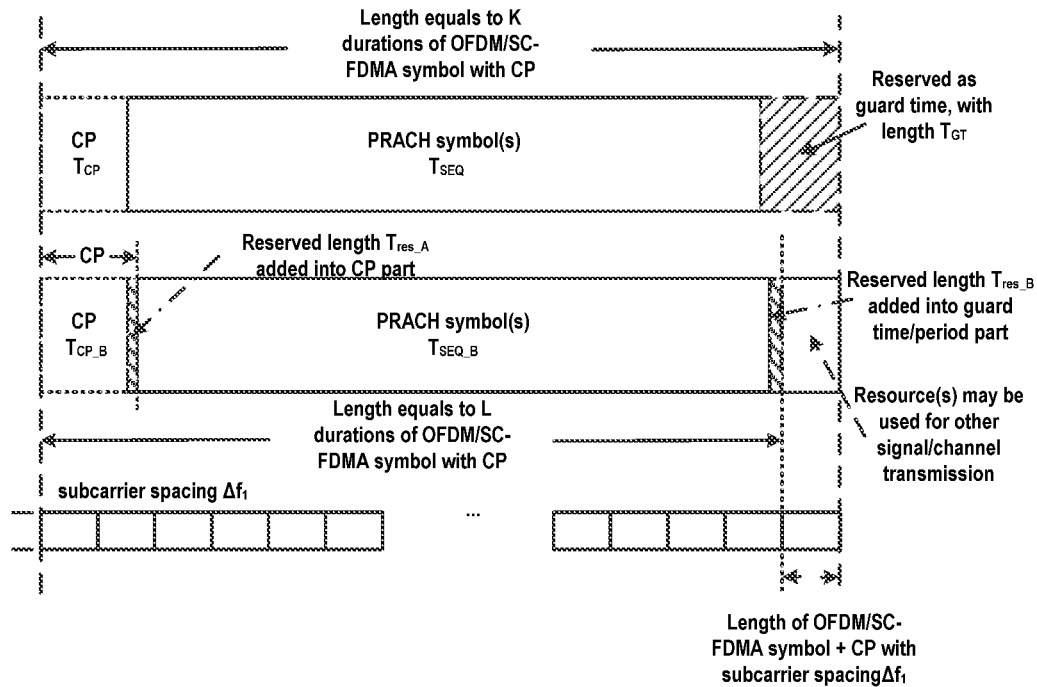

FIG. 6D illustrates a still further example of a PRACH configuration configured for the other cases, such as beam failure recovery request, or on demand SI request, and etc. As illustrated, the reserved length $T_{res}$ may be added in both guard time/period length and CP length as a part of the guard time/period and CP length, for example, the length of guard time/period may equal to $T_{GT\_B}+T_{res\_A}$, the length of CP may equal to $T_{CP\_B}+T_{res\_B}$, and $T_{res\_A}+T_{res\_B}=T_{res}$.

Figure 6E:
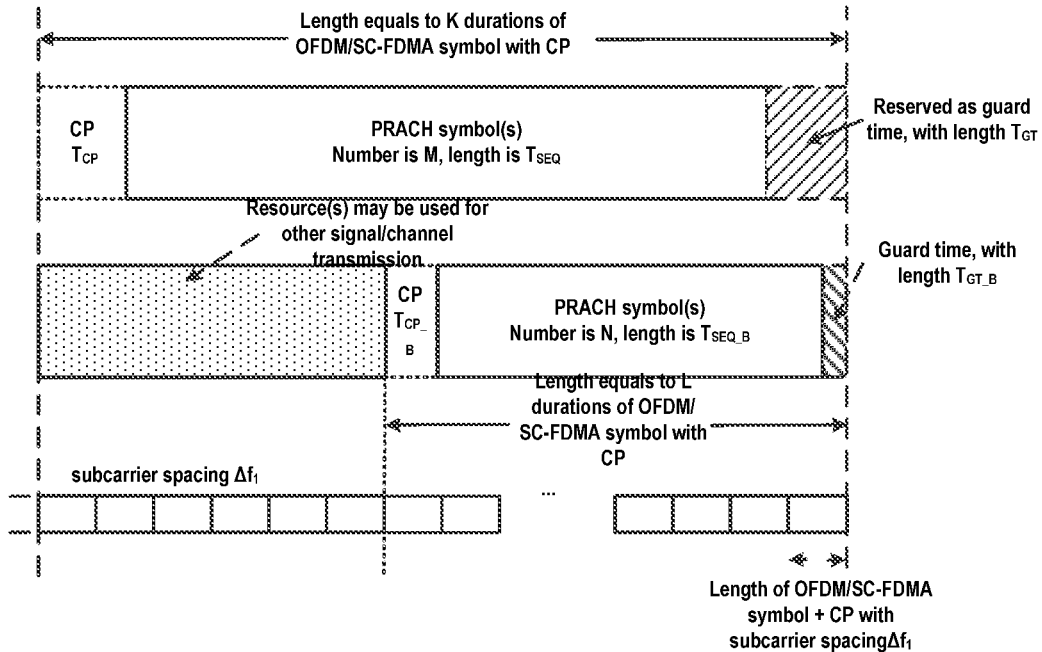
Figure 6F:
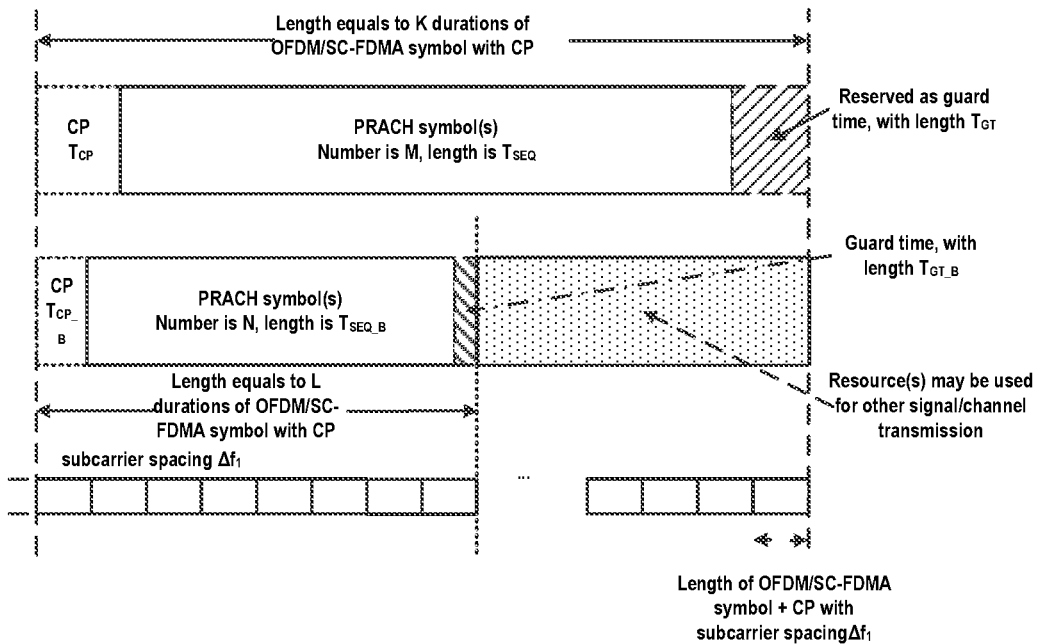
Figure 6G:
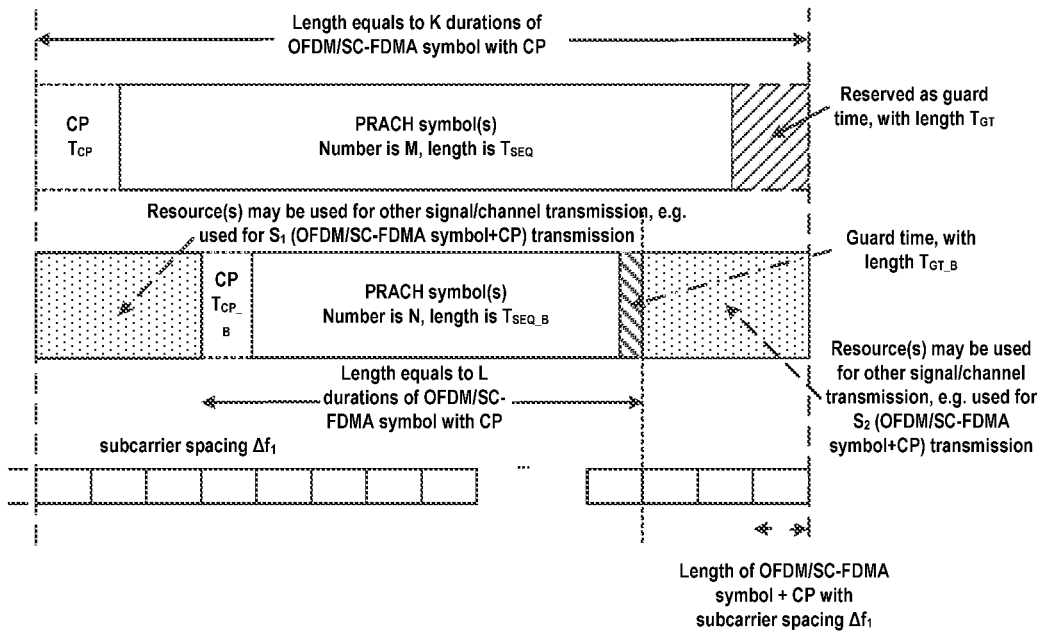

For illustrative purposes, FIGS. 6E to 6G further illustrate example PRACHs for the other cases such as beam failure recovery request, or on demand SI request and etc. However, it shall be noticed that these PRACHs are only given for illustrative purposes and the present disclosure is not limited thereto.

FIG. 6E illustrates an example PRACH for the other cases according to an embodiment of the present disclosure. And for illustrative purposes, the PRACH for the initial access and/or uplink synchronization is also illustrated for comparison. As illustrated, the remaining time and/or frequency resources may be located before the resources for PRACH transmission in time domain.

FIG. 6F illustrates an example PRACH for the other cases according to an embodiment of the present disclosure. And for illustrative purposes, the PRACH for the initial access and/or uplink synchronization is also illustrated for comparison. As illustrated, the remaining time and/or frequency resources may be located after the resources for PRACH transmission in time domain.

FIG. 6G illustrates an example PRACH for the other cases according to an embodiment of the present disclosure. And for illustrative purposes, the PRACH for the initial access and/or uplink synchronization is also illustrated for comparison. As illustrated, one part of the remaining time and/or frequency resources may be located before the resources for PRACH transmission in time domain and the other part of the remaining time and/or frequency resources may be located after the resources for PRACH transmission in time domain.

In an embodiment of the present disclosure, for transmission resource remaining due to differences between the transmitted physical random access channel and the random access channel for initial access, in step 402, it may be used for transmit transmission, for example at least one of other information and other channel. The transmission resource may be remained due to at least one of shorter cyclic prefix, no guard time, shorter guard time, shorter symbol/sequence, or less symbols.

For illustrative purposes, FIGS. 7A to 7D illustrate example PRACHs for the other cases such as beam failure recovery request, or on demand SI request and etc. However, it shall be noticed that these PRACHs are only given for illustrative purposes and the present disclosure is not limited thereto.

Figure 7A:
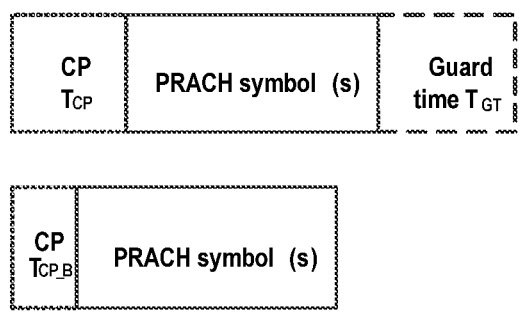
FIGS. 7A to 7D illustrate example structures of the PRACH structure for the other cases according to embodiments of the present disclosure.

FIG. 7A illustrates an example PRACH for the other cases according to an embodiment of the present disclosure. And for illustrative purposes, the PRACH for the initial access and/or uplink synchronization is also illustrated for comparison. As illustrated, the PRACH for the initial access and/or uplink synchronization has a CP length $T_{CP}$, located at the beginning of PRACH sequence(s) (Option 1) or at the each PRACH sequence (Option 2/4) and has a guard time $T_{GT}$. As compared, the example PRACH for the other cases has a shorter CP length $T_{CP-B}$ and/or no guard time.

Figure 7B:
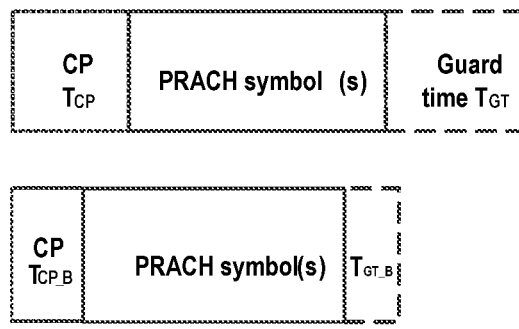

FIG. 7B illustrates another example PRACH for the other cases according to an embodiment of the present disclosure. As illustrated, compared with the PRACH for the initial access and/or uplink synchronization, the example PRACH for the other cases has a shorter CP length $T_{CP-B}$ and a shorter guard time $T_{GT\_B}$.

Figure 7C:
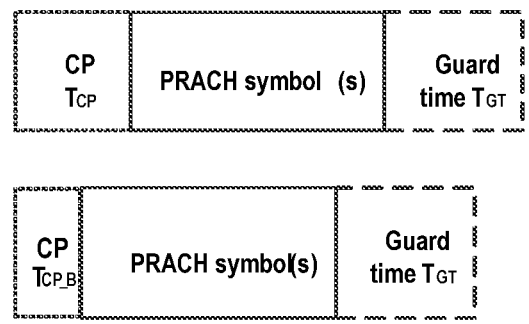

FIG. 7C illustrates a further example PRACH for the other cases according to an embodiment of the present disclosure. As illustrated, compared with the PRACH for the initial access and/or uplink synchronization, the example PRACH for the other cases has and the same guard time $T_{GT}$ but a shorter CP length $T_{CP-B}$.

Figure 7D:
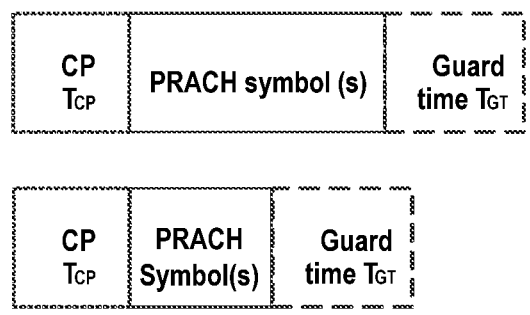

FIG. 7D illustrates a still further example PRACH for the other cases according to an embodiment of the present disclosure. As illustrated, compared by the PRACH for the initial access and/or uplink synchronization, the example PRACH for the other cases has a different PRACH symbol(s)/sequence(s) length, particularly a length $T_{SEQ-B}$ is shorter than the PRACH symbol(s)/sequence(s) length for the initial access and/or uplink synchronization. For example, the number of symbol(s)/sequence(s) for other cases may be different from the number of symbol(s)/sequence(s) for the initial access and/or uplink synchronization.

Figure 8:
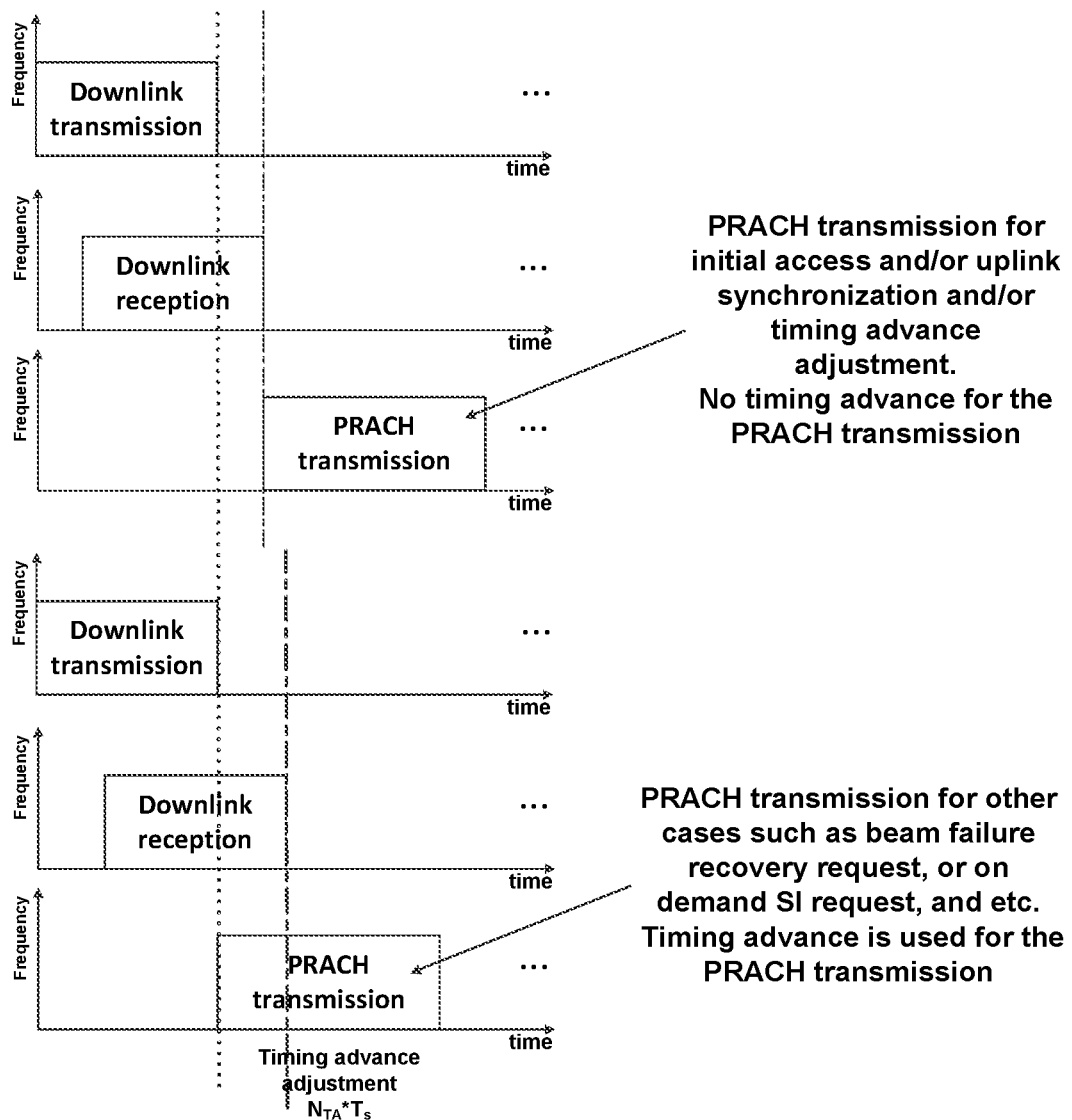
FIG. 8 schematically illustrates an example transmission for the other cases without GT according to an embodiment of the present disclosure.

FIG. 8 illustrates examples for PRACH transmission for the other cases, such as beam failure recovery request, or on demand SI request and etc. As illustrated in FIG. 8, the UL transmission for the PRACH can be transmitted with the TA which is still invalid for the other cases and for different UE, they may also use different TA values. In other words, each UE will transmit the physical random access channel at a timing before a start of a corresponding downlink reception, which is determined based on a timing advance value previously indicated by the network device. And for illustrative purposes, the PRACH for the initial access and/or uplink synchronization is also illustrated for comparison. The UL transmission for the PRACH for initial access and/or uplink synchronization and/or timing advance adjustment may be transmitted without timing advance.

In some embodiments of the present disclosure, the physical random access channel for the other cases may have a cyclic shift selected from a set of cyclic shifts different from a set of cyclic shifts for the physical random access for initial access. In some embodiment of the present disclosure, the PRACH for the other cases may have at least one of different number of cyclic shift values, different values of CS.

For an initial access PRACH transmission, the value of cyclic shift should satisfy the requirement that the smallest integer number of sequence sample periods is greater than the maximum delay spread and time uncertainty of an uplink non-synchronized UE, plus some additional guard samples. For the PRACH transmission for the other cases like beam recovery request, it may use different CS configurations of PRACH. Next, references will be made to FIGS. 9A and 9B to describe the different CS configurations.

Figure 9A:
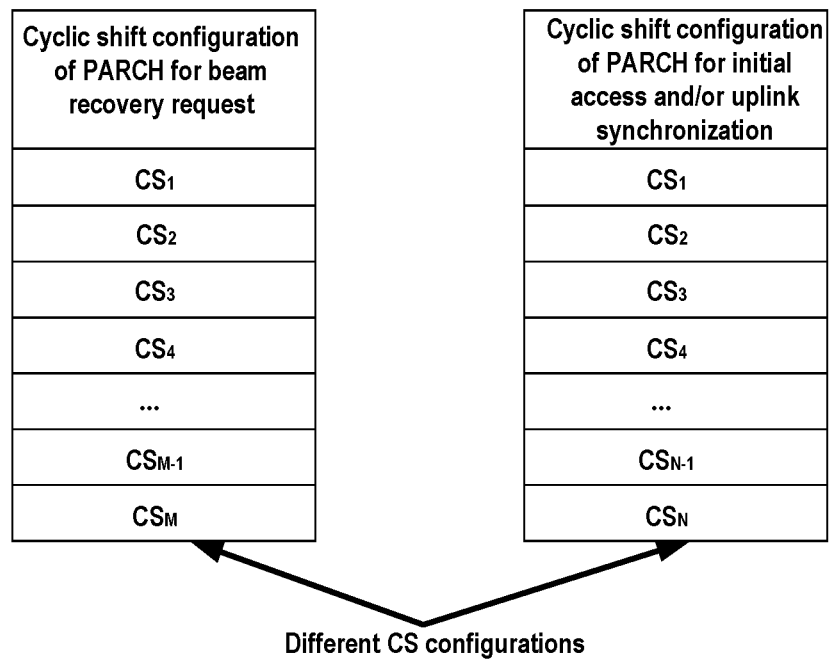
FIGS. 9A and 9B schematically illustrate different CS configurations among the other cases and initial access (and/or the uplink synchronization) according to an embodiment of the present disclosure.

FIG. 9A illustrates example CS configurations of PRACH for the other cases and for the initial access and/or uplink synchronization according to an embodiment of the present disclosure. As illustrated in FIG. 9A, there are M CS configurations of PRACH for the other cases and N CS configurations of PRACH for the initial access and/or uplink synchronization. The M may be equal to or larger than the N.

Figure 9B:
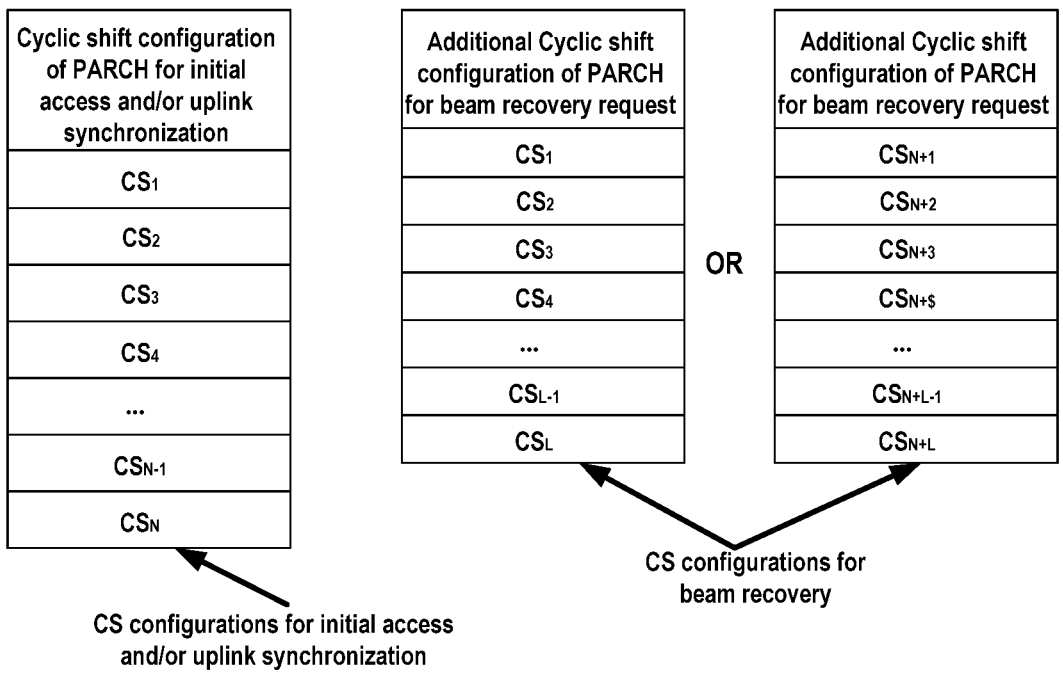

FIG. 9B illustrates another example CS configurations of PRACH for the other cases and for the initial access and/or uplink synchronization according to an embodiment of the present disclosure. As illustrated in FIG. 9B, there are N CS configurations of PRACH for the initial access and/or uplink synchronization and additional L CS configuration of PRACH for beam recover request. The additional L CS configurations can be numbered from 1 to L or some N+1 to N+L.

In some embodiments of the present disclosure, the PRACH for the other case may also use different time and/or frequency resources and/or different sequences from those for initial access and/or uplink synchronization.

Figure 10A:
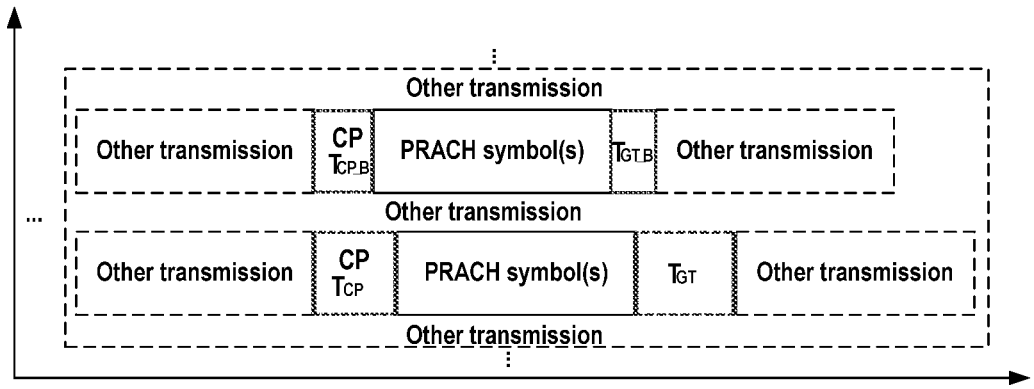
FIGS. 10A to 10C schematically illustrate different resource configurations for the PRACH for other cases like the beam recovery request or no-demand system information request according to an embodiment of the present disclosure.
Figure 10B:
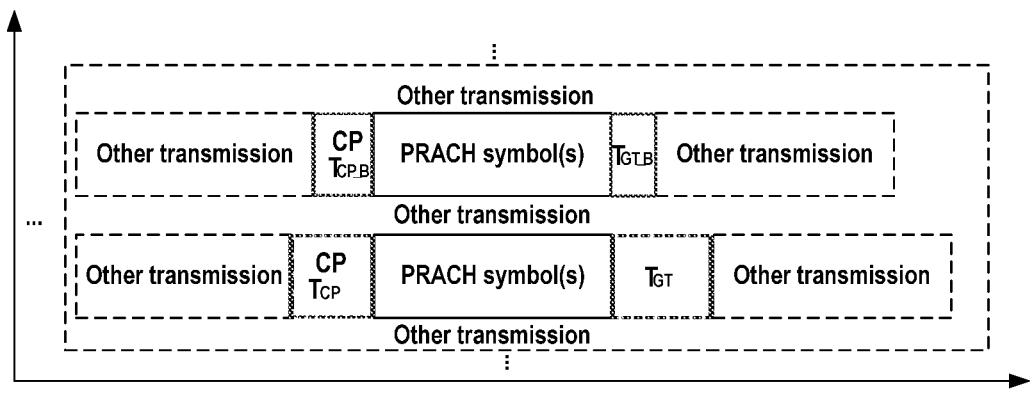
Figure 10C:
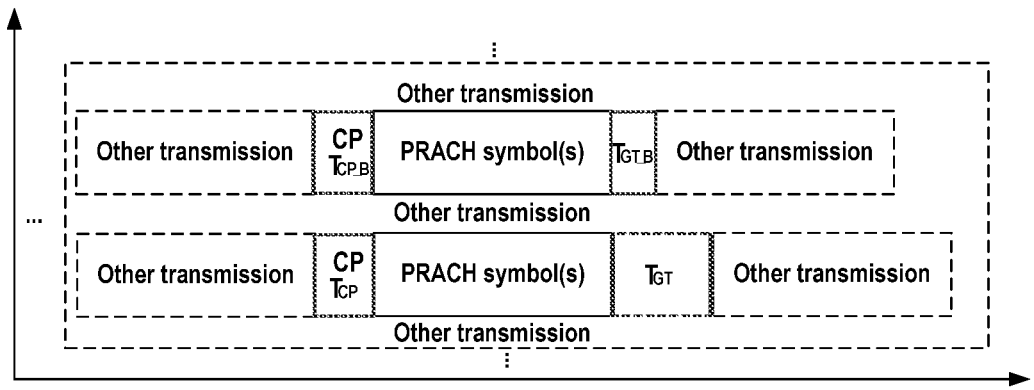

FIGS. 10A to 10C illustrate three examples of PRACH transmission resources for the other cases according to embodiments of the present disclosure. Herein, the resources for the other cases can be configured with for example FDM with that for initial access.

As illustrated in FIGS. 10A and 10B, the PRACH for the other cases has a shorter CP and a short GT. In FIG. 10A, the PRACH symbol(s) for the other case may be aligned with the PRACH symbols for the initial access; in FIG. 10B, the PRACH transmission for the other case may be aligned with the PRACH transmission for the initial transmission at the start of the CP.

In FIG. 10C, the PRACH for the other cases has the same CP length but a short GT. In such a case, in the PRACH transmission for the other case, both the CP and the PRACH can be aligned with those for the initial access.

In some embodiments of the present disclosure, the UE may further receive a time advance value in a response to the transmitted physical random access channel. In other words, the gNB may transmit a new TA value to the UE for the new beam. In some embodiments, UE may transmit a PRACH sequence to the gNB, and the gNB may receive the PRACH sequence, and gNB may transmit response to the UE. For different purpose of the PRACH transmission, gNB may transmit different response and/or different size of response to UE. In an embodiment of the present disclosure, for initial access and/or uplink synchronization and/or timing advance adjustment, the response may include timing advance value. And for other cases, such as beam failure recovery request, or on demand SI request and etc., the response may not include the timing advance value. In an embodiment of the present disclosure, for initial access, the response may include timing advance value with bit size M. And for other cases, such as beam failure recovery request, or on demand SI request and etc., the response may include the timing advance value with bit size N. For example, N may be smaller than M.

In some embodiments of the present disclosure, it is also possible to transmit the PRACH for the other cases without TA. In such a case, it may use the same PRACH structure with that for initial access and/or uplink synchronization. In addition, it may also use a different configuration from that for initial access and/or uplink synchronization. For example, it may use different time and/or frequency resources, different sequences or any combination thereof. And similarly, the resources for the other cases can be configured with FDM with that for initial access. It may also be possible to use different CS configurations of PRACH for beam failure recovery request transmission as described with FIGS. 9A and 9B.

In some embodiments, there may be a set of formats defined for PRACH transmission for initial access and/or uplink synchronization, for example, the number of the formats may be X. A subset of formats may be selected for PRACH transmission for other cases, such as beam failure recovery request, or on demand SI request and etc., for example, the number of subsets may be Y. In an embodiment of the present disclosure, Y may be smaller than X. That is, only one or more of the formats may be used for other cases.

Figure 11:
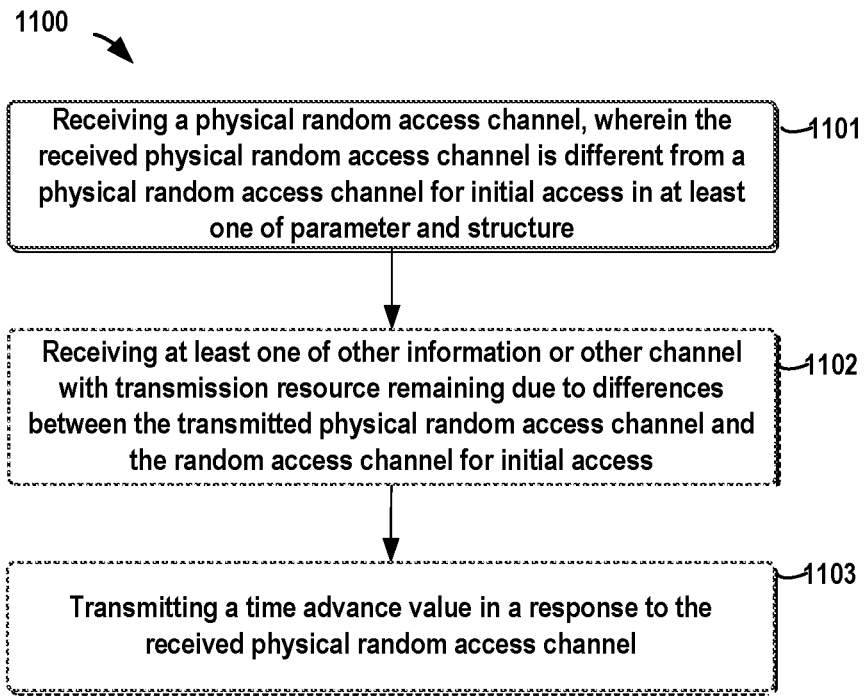
FIG. 11 illustrates a flow chart of a method of receiving PRACH at a network device according to an embodiment of the present disclosure.

FIG. 11 illustrates a flow chart of a method of transmitting PRACH at a network device according to an embodiment of the present disclosure.

As illustrated in FIG. 11, in step 1101, the gNB receives a physical random access channel, wherein the received physical random access channel is different from a physical random access channel for initial access in at least one of parameter and structure.

In an embodiment of the present disclosure, the parameter may comprise one or more of: cyclic shift configurations; cyclic prefix length; index of sequences; guard time/period length; the number of symbols or sequences; the length of symbols or sequences; and time and/or frequency resource.

In another embodiment of the present disclosure, the received physical random access channel may have no guard time or a guard time different from a guard time in the physical random access channel for initial access.

In a further embodiment of the present disclosure, the received physical random access channel may have a cyclic prefix different from a cyclic prefix in the physical random access channel for initial access.

In a still further embodiment of the present disclosure, the received physical random access channel may have a cyclic shift selected from a set of cyclic shifts different from a set of cyclic shifts for the physical random access for initial access.

Further as illustrated in step 1102, the method 1100 may further comprise: receiving at least one of other information and other channel with transmission resource remaining due to differences between the transmitted physical random access channel and the random access channel for initial access.

In an embodiment of the present disclosure, the transmission resource can be remained due to at least one of shorter cyclic prefix, no guard time, shorter guard time, shorter symbol/sequence, or less symbols.

In another embodiment of the present disclosure, the method may further comprise transmitting a time advance value in a response to the received physical random access channel in step 403.

In a further embodiment of the present disclosure, the transmitted physical random access channel can be used for at least one of a beam recovery request and on-demand system information request.

Figure 12:
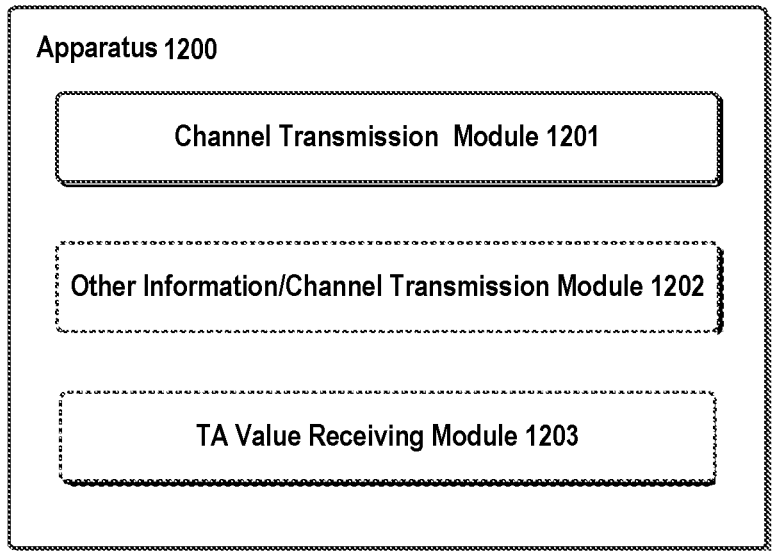
FIG. 12 illustrates an apparatus for transmitting PRACH at a terminal device according to an embodiment of the present disclosure.

FIG. 12 illustrates an apparatus for transmitting PRACH at a terminal device according to an embodiment of the present disclosure. Apparatus 1200 can be implemented at a terminal device such as UE. As illustrated in FIG. 12, apparatus 1200 may comprise a channel transmission module 1201, which is configured to transmit a physical random access channel, wherein the transmitted physical random access channel is different from a physical random access channel for initial access in at least one of parameter and structure.

In an embodiment of the present disclosure, the channel transmission module 1201, may be further configured to start the transmitting a physical random access channel at a timing before a start of a corresponding downlink reception, which is determined based on a timing advance value indicated by a network device.

In another embodiment of the present disclosure, the parameter may comprise one or more of: cyclic shift configurations; cyclic prefix length; index of sequences; guard time/period length; the number of symbols or sequences; the length of symbols or sequences; and time and/or frequency resource.

In a further embodiment of the present disclosure, the transmitted physical random access channel may have no guard time or has a guard time different from a guard time in the physical random access channel for initial access.

In a still further embodiment of the present disclosure, the transmitted physical random access channel may have a cyclic prefix different from a cyclic prefix in the physical random access channel for initial access.

In a yet further embodiment of the present disclosure, the transmitted physical random access channel may have a cyclic shift selected from a set of cyclic shifts different from a set of cyclic shifts for the physical random access for initial access.

In another embodiment of the present disclosure, apparatus 1200 may further comprise an information/channel transmission module, configured to transmit at least one of other information and other channel with transmission resource remaining due to differences between the transmitted physical random access channel and the random access channel for initial access.

In a further embodiment of the present disclosure, the transmission resource may be remained due to at least one of shorter cyclic prefix, no guard time, shorter guard time, shorter symbol/sequence, or less symbols.

In a still further embodiment of the present disclosure, apparatus 1200 may further comprise a TA value receiving module 1203, which is configured to receive a time advance value in a response to the transmitted physical random access channel.

In another embodiment of the present disclosure, the transmitted physical random access channel is used for at least one of a beam recovery request and on-demand system information request.

Figure 13:
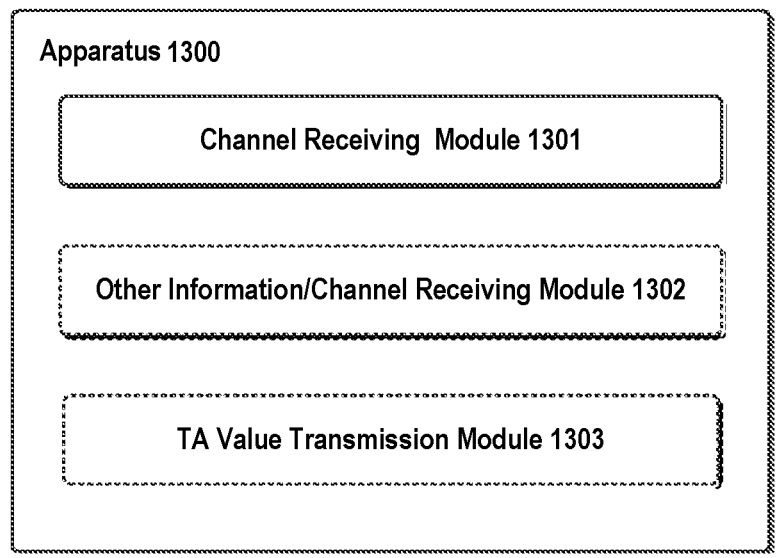
FIG. 13 illustrates an apparatus for transmitting PRACH at a network device according to an embodiment of the present disclosure.

FIG. 13 illustrates an apparatus for transmitting PRACH at a network device according to an embodiment of the present disclosure. Apparatus 800 can be implemented at a network device in the NR system, for example eNB.

As illustrated in FIG. 13, apparatus 1300 may comprise a channel receiving module 1301 configured to receive a physical random access channel, wherein the received physical random access channel is different from a physical random access channel for initial access in at least one of parameter and structure.

In an embodiment of the present disclosure, the parameter may comprise one or more of: cyclic shift configurations; cyclic prefix length; index of sequences; guard time/period length; the number of symbols or sequences; the length of symbols or sequences; and time and/or frequency resource.

In another embodiment of the present disclosure, the received physical random access channel may have no guard time or a guard time different from a guard time in the physical random access channel for initial access;

In a further embodiment of the present disclosure, the received physical random access channel may have a cyclic prefix different from a cyclic prefix in the physical random access channel for initial access;

In a still further embodiment of the present disclosure, the received physical random access channel may have a cyclic shift selected from a set of cyclic shifts different from a set of cyclic shifts for the physical random access for initial access;

In a yet further embodiment of the present disclosure, apparatus 1300 may further comprise other information/channel receiving module 1302, which is configured to receive at least one of other information and other channel with transmission resource remaining due to differences between the transmitted physical random access channel and the random access channel for initial access.

In another embodiment of the present disclosure, the transmission resource may be remained due to at least one of shorter cyclic prefix, no guard time, shorter guard time, shorter symbol/sequence, or less symbols.

In a further embodiment of the present disclosure, apparatus 1300 may further comprise a TA value transmission module 1303 configured to transmit a time advance value in a response to the received physical random access channel.

In a still further embodiment of the present disclosure, the transmitted physical random access channel is used for at least one of a beam recovery request and on-demand system information request.

Hereinbefore, the apparatuses 1200 and 1300 are described with reference to FIGS. 12 and 13 in brief. It is noted that the apparatuses 1200 and 1300 may be configured to implement functionalities as described with reference to FIGS. 4 to 11. Therefore, for details about the operations of modules in these apparatuses, one may refer to those descriptions made with respect to the respective steps of the methods with reference to FIGS. 4 to 11.

It is further noted that components of the apparatuses 1200 and 1300 may be embodied in hardware, software, firmware, and/or any combination thereof. For example, the components of apparatuses 1200 and 1300 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 1200 and 1300 may comprise at least one processor. The at least one processor suitable for use with embodiments of the present disclosure may include, by way of example, both general and special purpose processors already known or developed in the future. Apparatuses 1200 and 1300 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1200 and 1300 to at least perform operations according to the method as discussed with reference to FIGS. 4 to 11 respectively.

Figure 14:
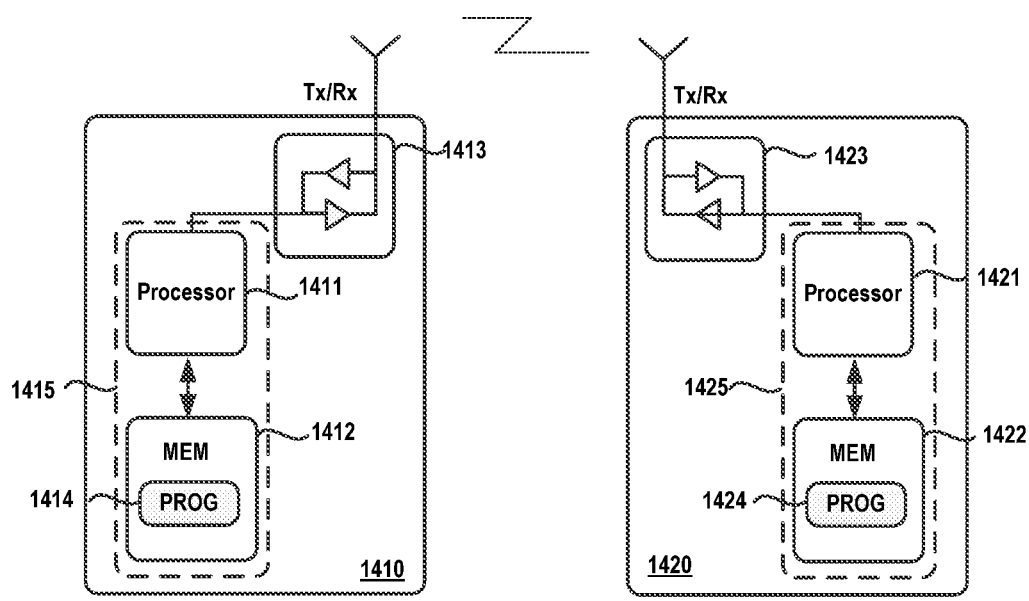
FIG. 14 further illustrates a simplified block diagram of an apparatus 1410 that may be embodied as or comprised in a network device ((like gNB), and an apparatus 1420 that may be embodied as or comprised in a terminal device like UE as described herein.

FIG. 14 further illustrates a simplified block diagram of an apparatus 1410 that may be embodied as or comprised in a network device like a base station in a wireless network and an apparatus 1420 that may be embodied as or comprised in a terminal device like UE as described herein.

The apparatus 1410 comprises at least one processor 1411, such as a data processor (DP) and at least one memory (MEM) 1412 coupled to the processor 1411. The apparatus 1410 may further comprise a transmitter TX and receiver RX 1413 coupled to the processor 1411, which may be operable to communicatively connect to the apparatus 1420. The MEM 1412 stores a program (PROG) 1414. The PROG 1414 may include instructions that, when executed on the associated processor 1411, enable the apparatus 1410 to operate in accordance with embodiments of the present disclosure, for example the method 1100. A combination of the at least one processor 1411 and the at least one MEM 1412 may form processing means 1415 adapted to implement various embodiments of the present disclosure.

The apparatus 1420 comprises at least one processor 1421, such as a DP, and at least one MEM 1422 coupled to the processor 1421. The apparatus 1420 may further comprise a suitable TX/RX 1423 coupled to the processor 1421, which may be operable for wireless communication with the apparatus 1410. The MEM 1422 stores a PROG 1424. The PROG 1424 may include instructions that, when executed on the associated processor 1421, enable the apparatus 1420 to operate in accordance with the embodiments of the present disclosure, for example to perform the method 400. A combination of the at least one processor 1421 and the at least one MEM 1422 may form processing means 1425 adapted to implement various embodiments of the present disclosure.

Various embodiments of the present disclosure may be implemented by computer program executable by one or more of the processors 1411, 1421, software, firmware, hardware or in a combination thereof.

The MEMs 1412 and 1422 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1411 and 1421 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A terminal comprising:
a processor configured to:
transmit, to a network device, a signal on PRACH (Physical Random Access Channel),
wherein the signal comprises a CP (cyclic prefix) and a preamble sequence,
wherein $X+Y=Z$,
wherein the X is a length of the CP,
wherein the Y is a length of the preamble sequence,
wherein the Z is a length of K OFDM (Orthogonal Frequency Division Multiplexing) symbols with CPs,
wherein the K is 4,
and
wherein the signal further comprises a guard time different from a guard time in a physical random access channel for initial access and not zero.

2. The terminal according to claim 1, wherein the signal on PRACH is for beam failure recovery.

3. The terminal according to claim 1, wherein the signal on PRACH is for on-demand SI (System Information) request.

4. A network device comprising:
a processor configured to:
receive, from a terminal, a signal on PRACH (Physical Random Access Channel),
wherein the signal comprises a CP (cyclic prefix) and a preamble sequence,
wherein $X+Y=Z$,
wherein the X is a length of the CP,
wherein the Y is a length of the preamble sequence,
wherein the Z is a length of K OFDM (Orthogonal Frequency Division Multiplexing) symbols with CPs,
wherein the K is 4,
and
wherein the signal further comprises a guard time different from a guard time in a physical random access channel for initial access and not zero.

5. The network device according to claim 4, wherein the signal on PRACH is for beam failure recovery.

6. The network device according to claim 4, wherein the signal on PRACH is for on-demand SI (System Information) request.

7. A method comprising:
transmitting a signal on PRACH (Physical Random Access Channel),
wherein the signal comprises a CP (cyclic prefix) and a preamble sequence,
wherein $X+Y=Z$,
wherein the X is a length of the CP,
wherein the Y is a length of the preamble sequence,
wherein the Z is a length of K OFDM (Orthogonal Frequency Division Multiplexing) symbols with CPs,
wherein the K is 4,
and
wherein the signal further comprises a guard time different from a guard time in a physical random access channel for initial access and not zero.

8. The method according to claim 7, wherein the signal on PRACH is for beam failure recovery.

9. The method according to claim 7, wherein the signal on PRACH is for on-demand SI (System Information) request.

10. A method comprising:
receiving a signal on PRACH (Physical Random Access Channel),
wherein the signal comprises a CP (cyclic prefix) and a preamble sequence,
wherein $X+Y=Z$,
wherein the X is a length of the CP,
wherein the Y is a length of the preamble sequence,
wherein the Z is a length of K OFDM (Orthogonal Frequency Division Multiplexing) symbols with CPs,
wherein the K is 4,
and
wherein the signal further comprises a guard time different from a guard time in a physical random access channel for initial access and not zero.

11. The method according to claim 10, wherein the signal on PRACH is for beam failure recovery.

12. The method according to claim 10, wherein the signal on PRACH is for on-demand SI (System Information) request.

* * * * *